Dec. 9, 1924.
O. H. G. STEED
ROTATABLE PIPE JOINT
Filed June 12, 1922
1,518,368
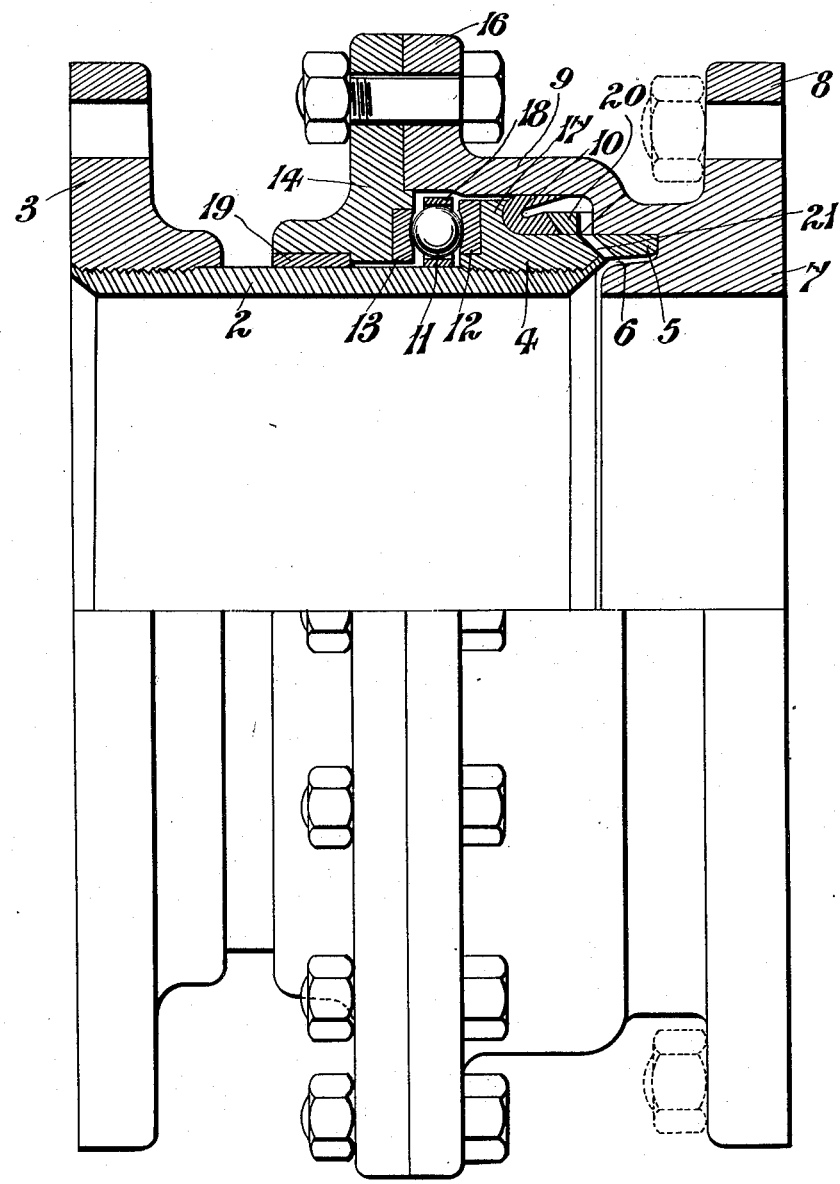

Patented Dec. 9, 1924.

1,518,368

UNITED STATES PATENT OFFICE.

OTHO HENRY GEORGE STEED, OF STAFFORD, ENGLAND.

ROTATABLE PIPE JOINT.

Application filed June 12, 1922. Serial No. 567,698.

*To all whom it may concern:*

Be it known that I, OTHO HENRY GEORGE STEED, a subject of the King of Great Britain, and resident of Stafford, in the county of Stafford, England, have invented certain new and useful Improvements in Rotatable Pipe Joints, of which the following is a specification.

This invention relates to rotatable pipe joints and has for its object to provide a fitting for pipes which will permit relative rotation of two pipes adapted to convey fluid under pressure.

The invention comprises a rotatable pipe joint of the spigot and socket kind consisting of two relatively rotatable members of which the outer ends are adapted to be connected respectively to the ends of the pipes to be joined, wherein the two members of the joint are made easily relatively rotatable and at the same time the joint between them fluid tight by means of a thrust ball bearing, and a U-shaped or other suitable packing ring interposed between the relatively rotatable surfaces of the two members.

In the preferred form of the joint one member which has a retaining flange or shoulder at its end extends into an enlarged portion of the other member, and a U-shaped packing ring is arranged between them in the usual manner, the first member is, in accordance with the present invention, provided at its end with a rim or annular portion projecting therefrom and extending into an annular recess provided in the inner end or base of the enlarged portion of the second member.

The retaining flange and projecting rim on the first member are preferably arranged at opposite ends of a sleeve member secured on the end of the first member, and enclosed within the enlarged portion of the second member by a flange secured over the open end thereof, so that a thrust bearing will be formed between the two flanges preventing longitudinal separation of the two members of the joint.

An embodiment of the invention is illustrated by the accompanying drawing which is a half sectional and a half external longitudinal view thereof.

In this illustration, 2 is a short length of pipe or socket of which one end is screwed and expanded into a flange 3 adapted to be connected to the end of one of the pipes to be joined. At the other end of the pipe 2 is an annular ring or sleeve 4 secured thereon in a similar manner to the flange 3. The sleeve 4 is formed at its end as an annular projection or rim 5 adapted to extend into an annular recess 6 formed in the second or socket member 7 of the joint. The outer end of the member 7 is provided with a flange 8 similar to the flange 3 and for the same purpose, and this member 7 is constructed with an enlarged portion 9 extending over the end of the pipe 2 of the first member, and forming a recess to accommodate a U-shaped packing ring 10, located between the inner surface or recess of the enlarged portion 9 and the outer surface of the sleeve 4. The sleeve 4 is provided at the end opposite to the projecting rim 5 with a flange 17 between which and a closing plate or flange 14 bolted to the flange 16 of the second member 7 is arranged a thrust ball bearing having balls 11, and ball races 12 and 13, and a cage member 18, of the usual type.

The flange 14 fits freely over the pipe 2 of the first member and the outer end of the annular space formed between them is provided with a dirt excluding ring 19 of any suitable material.

The inner edge of the U-shaped packing ring 10 is provided with a retaining ring 20, and a series of holes 21 are arranged circumferentially in the sleeve 4 in such a manner as to allow fluid under pressure to pass from the pipes to the inside of the U-shaped ring 10.

The pipes to be joined are connected to the flanges 3 and 8 at each end of the joint as a whole and can be relatively rotated at will even though there is considerable pressure within the pipe line. It will be appreciated that by the use of joints in accordance with the invention arranged at different angles movement of the pipe line in any direction can be provided for.

What I claim and desire to secure by Letters Patent is:—

1. A rotatable pipe joint comprising a spigot and a socket, a thrust bearing, a detachable annular closing plate closing the opening between the spigot and the socket and detachably fixed to the outer end of the socket, a sleeve secured to the end of the spigot within the socket, and a fluid tight packing ring, the inner side of the annular closing plate forming one thrust member of the bearing while the adjacent edge of the sleeve forms the other thrust member of the bearing, while the inner side of the packing ring engages the outer side of the sleeve and the outer side of the packing ring engages the inner surface of the socket.

2. A rotatable pipe joint comrising a spigot and a socket, a thrust ball bearing, a detachable annular closing plate closing the opening between the spigot and the socket and detachably fixed to the outer end of the socket, a sleeve secured to the end of the spigot within the socket, and a fluid tight packing ring, the inner side of the annular closing plate forming one ball race of the thrust ball bearing while the adjacent edge of the sleeve forms the opposing ball race of the thrust ball bearing, while the inner side of the packing ring engages the outer side of the sleeve and the outer side of the packing ring engages the inner surface of the socket.

3. A rotatable pipe joint comprising a spigot and a socket, a thrust bearing, a detachable annular closing plate closing the opening between the spigot and the socket and detachably fixed to the outer end of the socket, a flanged sleeve secured to the end of the spigot within the socket, and a fluid tight packing ring, the inner side of the annular closing plate forming one thrust member of the thrust bearing while the adjacent face of the flange of the sleeve forms the opposing thrust member of the thrust bearing, while the inner side and top of the packing ring engages the outer surface and flange of the flanged sleeve and the outer side of the packing ring engages the inner surface of the socket.

4. A rotatable pipe joint comprising a spigot and a socket provided with an annular groove in its inner end, a thrust bearing, a detachable annular closing plate closing the opening between the spigot and the socket and detachably fixed to the outer end of the socket, a sleeve secured to the end of the spigot within the socket and provided with an annular projection at its end, and a fluid tight packing ring, the inner side of the annular closing plate forming one thrust member of the bearing while the adjacent edge of the sleeve forms the other thrust member of the thrust bearing, the packing ring fitting between the sleeve and the inner surface of the socket and the annular projection on the sleeve extending into the annular groove in the inner end of the socket.

5. A rotatable pipe joint comprising a spigot and socket provided with an annular groove in its inner end, a thrust bearing, a detachable annular closing plate closing the opening between the spigot and the socket and detachably fixed to the outer end of the spigot, a flanged sleeve secured to the end of the spigot within the socket and provided at its end with a laterally perforated annular projection, and a U-shaped packing ring, the inner side of the annular closing plate forming one thrust member of the bearing while the adjacent edge of the sleeve forms the other thrust member of the thrust bearing, one side of the U-shaped packing ring engaging the outer surface of the sleeve and the top of the packing ring the flange of the sleeve while the outer side of the packing ring engages the inner surface of the socket, and the annular projection on the sleeve extends into the annular groove in the inner end of the socket and the lateral perforations in the extension of the sleeve form fluid passages for admitting fluid from the pipes to the inner surfaces of the U-shaped packing ring.

6. A rotatable pipe joint comprising a spigot and socket provided with an annular groove in its inner end, a thrust ball bearing, a detachable annular closing plate closing the opening between the spigot and the socket and detachably fixed to the outer end of the spigot, a flanged sleeve secured to the end of the spigot within the socket and provided at its end with a laterally perforated annular projection, and a U-shaped packing ring, the inner side of the annular closing plate having one ball race of the thrust ball bearing while the adjacent edge of the sleeve has the other ball race of the thrust ball bearing, the U-shaped packing ring being between the balls of thrust bearing and one side thereof engaging the outer surface of the sleeve and the top of the packing ring the flange of the sleeve while the outer side of the packing ring engages the inner surface of the socket, and the annular projection on the sleeve extends into the annular groove in the inner end of the socket and the lateral perforations in the extension of the sleeve form fluid passages for admitting fluid from the pipes to the inner surfaces of the U-shaped packing ring.

In witness whereof I affix my signature.

OTHO HENRY GEORGE STEED.